Dec. 31, 1968   V. MISHKOVSKY   3,419,791

LEVEL DETECTOR FOR ELECTRIC CURRENT

Filed Sept. 8, 1966

INVENTOR:
VICTOR MISHKOVSKY,

BY William Freedman

ATTORNEY

United States Patent Office 3,419,791
Patented Dec. 31, 1968

3,419,791
LEVEL DETECTOR FOR ELECTRIC CURRENT
Victor Mishkovsky, Ashland, N.J., assignor to General Electric Company, a corporation of New York
Filed Sept. 8, 1966, Ser. No. 577,966
6 Claims. (Cl. 323—44)

This invention relates to a level detector for electric current and, more particularly, relates to a level detector that produces a high-energy pulse signal when the current reaches a predetermined level.

In many circuit applications, it is necessary to quickly operate a device as soon as the current through a given circuit reaches a predetermined level. This is customarily done with a level detecting circuit that can sense the current level and can produce an electric pulse for operating the device when the current level reaches the required value. These level detecting circuits have typically contained a relatively large number of components and have been relatively complex. In many cases, they have been unduly sensitive to temperature variations and have been adversely affected by frequent repetitive operations.

An object of my invention is to provide a simple inexpensive level detector that is relatively insensitive to temperature variations and is unaffected by repetitive operations.

Another object is to provide a level detector of this type that can produce a high-energy pulse signal and which is well isolated from the circuit in which current is sensed.

In carrying out my invention in one particular form, I provide a conductor which carries the current that is to be sensed. A core of magnetizable material surrounds the conductor and forms a path around the conductor for flux developed by current through the conductor. The core has a notch therein that extends transversely of the core but only partially therethrough and a neck portion adjacent said notch forming a flux path shunting said notch for limiting the passage of flux across the notch when the flux level is low. Located within the notch is a coil having its turns untraversed by flux passing through said neck portion. The neck portion has magnetic properties that cause saturation of the neck portion to occur at a lower current than the minimum current needed to produce saturation of the remainder of the core. When the neck portion saturates in response to current of a predetermined magnitude, the added flux resulting from higher current is forced through said notch to induce a voltage pulse in the coil.

For a better understanding of the invention, reference may be had to the following description taken in conjunction with the accompanying drawing, wherein.

Figure 1:
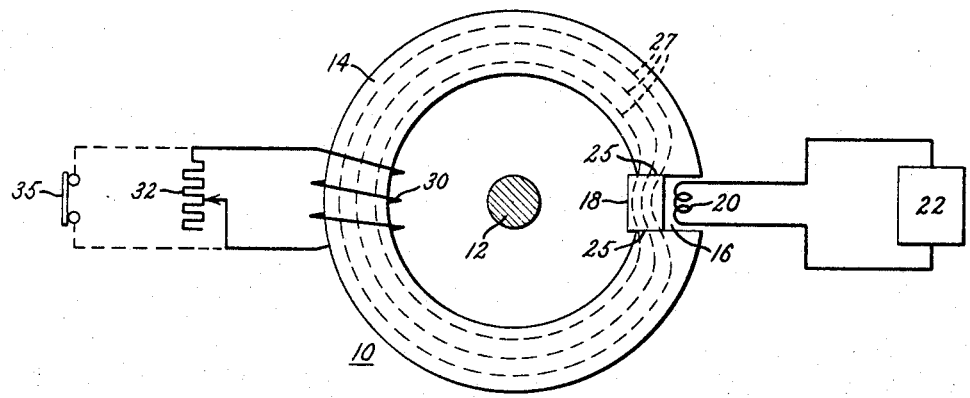
FIG. 1 illustrates a level detector embodying one form of the invention.

Referring now to FIG. 1, there is shown a level detector 10 that is used for sensing the level of current flowing through a conductor 12. The level detector comprises an annular core 14 of magnetizable material surrounding the conductor 12 in spaced relationship thereto. The core 14 includes a radially-extending notch 16 disposed opposite a neck portion 18. This neck portion 18 is occasionally referred to hereinafter as a shunting portion. Located within the notch 16 is a coil 20 that is shown connected across an output device 22. This output device, which is schematically depicted in block form, can be a relay, a trigger gap, a solenoid or any other suitable electro-responsive device that is capable of operating in response to reception of an electric pulse. The coil is preferably encapsulated in suitable insulation (not shown) to provide physical support therefor and appropriate electrical insulation.

The core 14, including the neck portion 18, is made of a high permeability magnetic material. In a preferred form of the invention, the neck portion 18 is made of a material that has substantially square loop magnetic properties that cause it to abruptly saturate when the flux passing therethrough reaches a predetermined level. An example of such material is the nickel-iron alloy sold by Arnold Engineering Co. under the trademark "Deltamax." The remainder of the core can be made of the same magnetic material as the neck portion 18 or of a magnetic material with more gradual saturation characteristics, e.g., conventional transformer iron, but it should have a large enough cross-section so that it remains unsaturated at the flux level that produces saturation of the neck portion. The neck portion 18 is joined to the remainder of the core 14 by means of low reluctance joints 25 provided at the upper and lower faces of the neck portion.

Current flowing in conductor 12 develops magnetic flux in the core 14 that is substantially proportional in magnitude to the magnitude of the current. This flux normally follows paths through the core extending circumferentially thereof, as depicted by the dotted lines 27. Since the neck portion 18 is of high permeability material, it normally forms a path for the flux that effectively shunts the notch 16 and substantially prevents the turns of coil 20 from being traversed by the flux. Under this condition, the voltage across the output terminals of the coil 20 is substantially zero. This condition prevails so long as the current through conductor 12 is below a predetermined level. But when the current through the conductor 12 reaches a predetermined level, the flux through neck portion 18 is at a high enough level to produce saturation of the neck portion. Any further increase in current will produce an excess flux which cannot be accommodated by the saturated neck, or shunting, portion and therefore passes through the notch and the coil, thereby inducing a voltage in the coil.

Since the neck portion 18 has substantially square loop magnetic properties, it saturates abruptly when the flux reaches the predetermined level, causing the flux through coil 20 to rise abruptly from a very low value, thereby producing the desired sharp voltage pulse across the coil output terminals. The pulse amplitude will depend upon the number of turns in coil 20.

When the level detector 10 is being used for sensing alternating current in the conductor 12, I can adjust the current level at which the level detector 10 will respond by providing an auxiliary winding 30 linked with the core 14. Across the terminals of this auxiliary winding an adjustable resistor 32 is connected. Current flowing through primary conductor 12 induces a secondary current in the winding 30 and resistor 32 that varies inversely with the resistance of resistor 32. This secondary current produces a counter-flux which opposes the flux induced in core 14 by current through primary conductor 12. By adjusting resistor 32 to adjust the secondary current, the net amount of flux produced in core 14 by a given primary current can be adjusted. Thus, the current level at which coil 20 produces the above described voltage pulse can be adjusted by adjusting resistor 32.

In some applications, it may be desirable to disable the level detector 10 under certain conditions even though an overcurrent is flowing through primary conductor 12. This can be readily done by connecting across the resistor 32 a normally-closed shorting switch (shown in dotted line form at 35). When this switch 35 is closed, the secondary current is relatively high and little net flux is present in core 14 to operate the level detector. However, when the switch 35 is opened by suitable control means (not shown), its disabling effect is removed and the level detector can respond in the above-described manner to current through primary conductor 12. Where this disabling effect is not needed, the switch 35 is omitted.

It should be apparent that my level detector is a simple device, requiring no complex circuitry or separate source of control power. Its performance is affected by temperature variations to a much lesser extent than most circuits that include electronic components. Its components are rugged and can withstand frequently repetitive operations without damage. The output coil 20 is well isolated from the primary conductor 12 in view of the insulation provided between core 14 and primary conductor 12. Thus, the primary conductor 12 may operate at a high voltage, while the coil 20 controls an output device 22 at ground or some other low potential.

The energy content of the output pulse for a given rate of change of current in conductor 12 depends upon the cross-section and material of core 14, the configuration of the neck 18 and notch 16, and the number of turns in coil 20. By suitably controlling these parameters, an output pulse of exceptionally high energy content can be derived from the level detector 10.

While in the preferred form of my invention, the neck portion 18 is made of substantially square loop magnetic material and the remainder of the core of a conventional magnetic material that saturates more gradually, the invention in its broader aspects it not so limited. For example, the entire core may be made of the same magnetic material, provided the neck portion saturates before the remainder of the core on rising current. The reduced cross section of the neck will ordinarily cause it to saturate prior to the remainder of the core. If the neck is of square loop material, this saturation will occur more abruptly and the output pulse will be sharper; but if a less sharp pulse can be tolerated, a more rounded loop magnetic material may be used for the neck portion.

Figure 2:
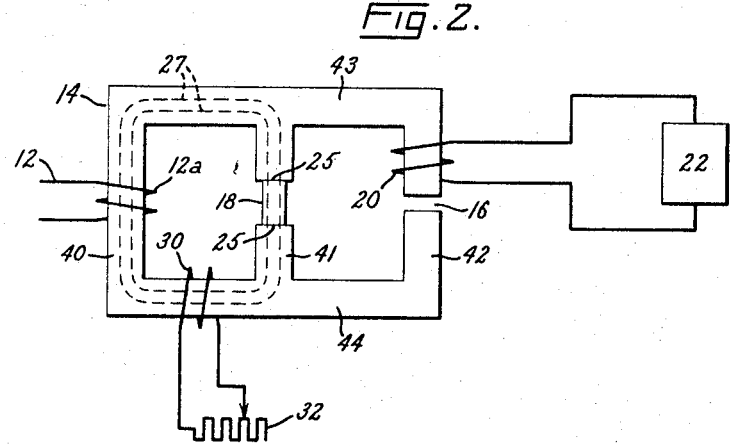
FIG. 2 illustrates a modified level detector embodying another form of the invention.

FIG. 2 illustrates a modified form of the invention. This embodiment of FIG. 2 is similar to that of FIG. 1, and the same reference numerals are used to designate corresponding parts. In FIG. 2 the core 14 comprises three legs 40, 41 and 42. The primary conductor 12 is shown coupled to an outside leg 40 through a multiple turn primary winding 12a. If a single turn primary is used, it can be provided by directing the conductor 12 through the window between legs 40 and 41. The central leg 41 contains a neck portion 18 of high permeability magnetic material having substantially square loop properties. This neck portion is joined to the remainder of the leg 41 by means of low reluctance joints 25 provided at the upper and lower faces of the neck portion. The remainder of the core can be made of the same magnetic material as the neck portion 18 or of a magnetic material with more gradual saturation characteristics, but it should have a large enough cross-section to remain unsaturated at flux levels that produce saturation of the neck portion.

The remaining leg 42 contains an air gap 16 and has a secondary winding or coil 20 coupled thereto. The air gap 16 imparts a high reluctance to the leg 42 which normally substantially prevents flux from passing through leg 42 and traversing the coil 20. If the two legs 41 and 42 of the core of FIG. 2 are thought of as portions of a single leg, the close similarity between the embodiments of FIGS. 1 and 2 will be apparent. Air gap 16 of FIG. 2 may be thought of as extending only partially through the composite leg 41, 42.

Current flowing in primary conductor 12 of FIG. 2 develops magnetic flux in the core normally following the dotted line paths 27. These dotted line paths extend over a closed magnetic circuit via the legs 40 and 41. Since the neck portion 18 in leg 41 is of high permeability material, the leg 41 forms a low reluctance path for flux that effectively shunts the high reluctance leg 42 and substantially permits the turns of secondary winding 20 from being traversed by the flux. This condition prevails so long as the current through conductor 12 is below a predetermined level. But when the current through conductor 12 reaches a predetermined level, the flux through neck portion 18 is at a high enough level to produce saturation of the neck portion. Any further increase in current will produce an excess flux which cannot be accommodated by the saturated neck portion and therefore passes through the leg 42 via air gap 16, thereby inducing a voltage in secondary winding 20. The square loop properties of the neck portion cause it to saturate abruptly when the flux reaches a predetermined level, thus causing the flux through secondary winding 20 to rise abruptly from a very low value, thereby producing the desired sharp voltage pulse across the output terminals of coil 20.

Since the legs 41 and 42 share the flux under certain conditions, they may be considered as being in parallel magnetic circuit relationship with each other with reference to flux developed by current through conductor 12. Although the gap 16 is shown in a vertical portion of leg 42, it could alternatively be located in the horizontal portion 43 or 44 of the core to the right of central vertical leg 41. These horizontal portions 43 and 44 of the core can be considered as parts of leg 42.

Figure 3:
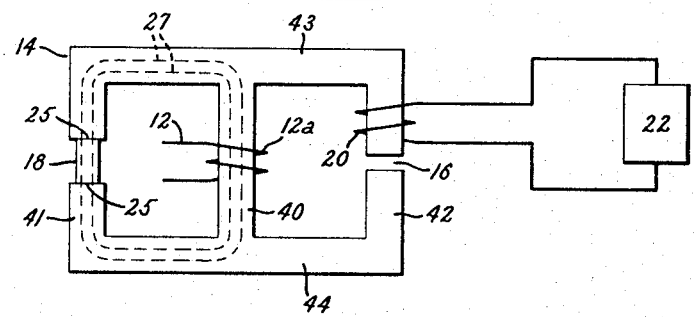
FIG. 3 illustrates another level detector embodying still another form of the invention.

FIG. 3 illustrates still another embodiment of the invention. This embodiment is quite similar to that of FIG. 2, and the same reference numerals have therefore been used to designate corresponding parts. The main difference between the embodiment of FIG. 3 and that of FIG. 2 is that the position of legs 40 and 41 has been interchanged. In FIG. 3 the leg 40 to which the primary conductor 12 is coupled is a centrally located leg, and the leg 41 containing square-loop neck portion 18 is at one side of the core 14. Under normal circuit conditions, the flux developed by current through conductor 12 follows paths such as 27 through legs 40 and 41. But when current through primary conductor 12 reaches a predetermined level, neck portion 18 abruptly saturates, forcing excess flux through the remaining leg 42 via air gap 16. This induces a sharply rising voltage pulse in coil 20 in the same manner as described hereinabove in connection with FIG. 2.

For controlling the current level at which saturation of neck portion 18 of FIGS. 2 or 3 occurs, a control winding 30 with an adjustable resistor 32 connected thereacross can be used. These components 30, 32, which are shown in FIG. 2, operate in the same manner here as described in connection with FIG. 1.

While I have shown and described particular embodiments of the invention, it will be obvious to those skilled in the art that various changes and modifications may be made without departing from the invention in its broader aspects; and I, therefore, intend in the appended claims to cover all such changes and modifications as fall within the true spirit and scope of the invention.

What I claim as new and desire to secure by Letters Patent of the United States is:

1. Means for developing a voltage pulse when the current flowing through a conductor reaches a predetermined level, comprising:
   (a) a core of magnetic material surrounding said conductor and forming a path around said conductor for flux developed by current through said conductor,
   (b) a coil having its turns substantially untraversed by flux passing through said core when the flux level is low,
   (c) said core having a high permeability shunting portion forming a flux path shunting said coil and substantially preventing said coil from being traversed by flux passing through said core while said shunting portion is unsaturated,
   (d) and means for directing a substantial portion of the flux in said core through a path traversing said coil when said high permeability shunting portion saturates, (e) said shunting portion being saturable on rising current prior to the remainder of said core and having substantially square loop magnetic properties that cause saturation to occur abruptly when the flux passing therethrough reaches a predetermined level, thereupon abruptly forcing flux through said path traversing said coil, thus inducing a sharp voltage pulse in said coil.

2. The apparatus of claim 1 in which said core comprises:

(a) a pair of legs that are in parallel magnetic circuit relationship with each other with reference to flux developed by current through said conductor, (b) a first of said legs comprising said shunting portion, and a second of said legs including a gap that substantially prevents the passage of flux through said second leg when said shunting portion is unsaturated, (c) said second leg serving as the means for directing flux through said path traversing said coil when said shunting portion saturates.

3. The apparatus of claim 1 in combination with means for adjusting the current level at which said pulse is produced comprising an auxiliary winding linked to said core and an adjustable impedance connected in circuit with said winding for controlling the amount of current induced in said winding by flux in said core.

4. The apparatus of claim 3 in combination with a normally-closed shorting switch normally providing a low impedance path across said coil to disable said level detector, said switch being openable to remove said disabling effect.

5. Means for developing a voltage pulse when the current flowing through a conductor reaches a predetermined level, comprising:

(a) a core of magnetic material surrounding said conductor and forming a path around said conductor for flux developed by current through said conductor, (b) said core having a notch therein that extends transversely of the core but only partially therethrough and a neck portion adjacent said notch forming a flux path shunting said notch for limiting the passage of flux across said notch when the flux level is low, (c) a coil located in said notch and having its turns untraversed by flux passing through said neck portion, (d) said neck portion having magnetic properties that cause saturation of said magnetic portion to occur at a lower current than the minimum current needed to produce saturation of the remainder of said core, and (e) said neck portion saturating when said current reaches said predetermined level, thereafter forcing flux through said notch, thereby inducing a voltage pulse in said coil.

6. The combination of claim 5 in which said neck portion is made of a magnetic material that has substantially square loop properties that cause saturation of said neck portion to occur abruptly, thereby producing a sharp voltage pulse in said coil.

References Cited

UNITED STATES PATENTS 3,324,393   6/1967   Casey et al. _____ 324—127 X

JOHN F. COUCH, *Primary Examiner.*

G. GOLDBERG, *Assistant Examiner.*

U.S. Cl. X.R.

324—127; 328—33, 65; 340—253